United States Patent
Bastholm

(10) Patent No.: US 6,841,953 B2
(45) Date of Patent: Jan. 11, 2005

(54) CONTROL FOR TWO OR MORE DC MOTORS, IN PARTICULAR ACTUATORS FOR ADJUSTMENT OF FURNITURE

(75) Inventor: Jeppe Bastholm, Sønderborg (DK)

(73) Assignee: Linak A/S, Nordborg (DK)

( * ) Notice: Subject to any disclaimer, the term of this patent is extended or adjusted under 35 U.S.C. 154(b) by 79 days.

(21) Appl. No.: 10/312,994

(22) PCT Filed: Jul. 5, 2001

(86) PCT No.: PCT/DK01/00470

§ 371 (c)(1),
(2), (4) Date: Jan. 3, 2003

(87) PCT Pub. No.: WO02/03526

PCT Pub. Date: Jan. 10, 2002

(65) Prior Publication Data

US 2003/0117094 A1 Jun. 26, 2003

(51) Int. Cl.[7] .............................. H02P 5/46; H02P 7/74
(52) U.S. Cl. ................... 318/7; 318/9; 318/34; 318/37; 318/105; 5/616
(58) Field of Search ................ 318/7, 9, 37, 34, 318/43, 53, 66, 105, 110, 560, 562–564, 16, 114, 119, 128, 129, 286, 466, 468; 108/20, 147; 248/188.4; 5/616, 915

(56) References Cited

U.S. PATENT DOCUMENTS

| | | | |
|---|---|---|---|
| 3,926,513 A | * 12/1975 | Silver et al. ................. 318/7 |
| 4,012,134 A | * 3/1977 | Silver et al. ................. 318/10 |
| 4,025,972 A | * 5/1977 | Adams et al. ................. 5/616 |
| 4,156,257 A | * 5/1979 | Roberts ...................... 318/7 |
| 4,174,237 A | * 11/1979 | Hemming et al. ............ 318/59 |
| 4,423,360 A | 12/1983 | Pasterkamp |
| 4,484,121 A | * 11/1984 | Chambron ................... 318/640 |
| 4,733,144 A | 3/1988 | Bisseling |
| 4,740,732 A | 4/1988 | Way |
| 5,161,274 A | 11/1992 | Hayes et al. |
| 5,205,004 A | 4/1993 | Hayes et al. |
| 5,239,247 A | * 8/1993 | Habig et al. ........... 318/568.18 |
| 5,528,114 A | * 6/1996 | Tokizaki et al. ............ 318/67 |
| 5,544,376 A | * 8/1996 | Fromson .................... 5/618 |
| 5,596,253 A | * 1/1997 | Mizuta et al. .............. 318/469 |
| 5,600,214 A | * 2/1997 | Fromson ................... 318/120 |
| 5,715,548 A | * 2/1998 | Weismiller et al. ........... 5/624 |
| 5,898,280 A | * 4/1999 | Yang ....................... 318/51 |
| 6,106,576 A | * 8/2000 | Fromson .................... 318/16 |
| 6,509,705 B2 | * 1/2003 | Bastholm et al. ........... 318/434 |
| 6,539,566 B1 | * 4/2003 | Hayes ...................... 5/618 |
| 6,595,144 B1 | * 7/2003 | Doyle ...................... 108/147 |
| 6,650,072 B2 | * 11/2003 | Harlan ..................... 318/254 |

* cited by examiner

Primary Examiner—David Martin
Assistant Examiner—Eduardo Colon Santana
(74) Attorney, Agent, or Firm—Dykema Gossett PLLC

(57) ABSTRACT

A control for DC motors, in particular actuators driven by a DC motor for adjustment of furniture, such as tables, beds, chairs, etc. includes a pseudomotor which is capable of supplying a voltage that corresponds to the motor speed on the basis of the current and voltage supplied to the motor. The voltage of the pseudomotor is supplied to an adjustable power supply, where it is compared with an internal reference voltage and adjusts the voltage difference down to the smallest possible difference between the voltage of the pseudomotor and the internal reference voltage. For greater accuracy, the control additionally includes a compensation circuit configured to evaluate a dominating frequency in the commutator noise. Thus, there is provided a simple and low cost control for parallel running of two or more actuators.

4 Claims, 2 Drawing Sheets

CONTROL FOR TWO OR MORE DC MOTORS, IN PARTICULAR ACTUATORS FOR ADJUSTMENT OF FURNITURE

BACKGROUND OF THE INVENTION

The present invention relates to a control for two or more DC motors, in particular actuators driven by a DC motor for adjustment of furniture, such as tables, beds, chairs, etc, wherein the motors are connected to an adjustable power supply, and wherein the control is adapted to adjust the power supply to the individual motors such that the motors mutually keep the same or essentially the same speed independent of different loads on them.

Adjustment of beds and tables is performed using linear actuators of the type which comprises a spindle driven by a reversible DC motor, said spindle being provided with a spindle nut which, either directly or via an extension rod, is connected with the element to be adjusted. For a height-adjustable desk carried by a single leg at each side there is a linear actuator in each leg, and for beds there is one at each end for lifting the mattress frame. U.S. Pat. No. 5,224,429 Haworth Inc. describes such a height adjustable desk and EP 488 552 Huntleigh Technology plc describes a height adjustable bed.

The prior art for operating linear actuators to obtain uniform travel thereamong is based on a direct or indirect measurement of a distance travelled and a comparison of these. A typical approach is to count the number of revolutions of the spindle or another element in the transmission by an encoder or a rotary potentiometer, e.g. as described in the above US-patent. A comparison of the number of revolutions forms the basis for the control of the motors. It will be appreciated that a certain span of time elapses from a beginning aparallelism between the two actuators before a regulation can be carried out. These controls are relatively expensive and complicated since they are based on computer controls.

SUMMARY OF THE INVENTION

The object of the invention is to provide a simple and low cost control which may be used for operating two or more actuators to obtain uniform travel thereamong.

This is achieved according to the invention by a control as defined in claim 1.

In the present context, a pseudomotor is a circuit which electrically behaves like the DC motors concerned, and which is determined on the basis of the electrical properties of the motors.

The invention thus realizes that the control may be based on a pseudomotor which supplies a voltage corresponding to the speed of the motor on the basis of the energy supplied to the motor, said voltage being used for regulating the power supply.

It will be appreciated that the control departs from the previously mentioned controls in that the actuator does not have to travel a distance before an adjustment can take place, but that, instead, the energy transformed in the motor is used as the basis, thus allowing a quicker adjustment to be made.

It is recognized that there is a certain deviation in the electrical values of the motors, which results in inaccuracy in the control. This is obviated in that the present control additionally comprises a compensation circuit based on the frequency of the commutator noise from the individual motors, wherein a comparison is made in the compensation circuit of the frequencies from the individual motors, and in case of a deviation of the frequency from one motor relative to the frequencies of the others, the power supply to said motor or to the other motors is adjusted so that the frequencies correspond. This results in a very accurate control of the motors.

It is known to control a DC motor on the basis of the frequency of the commutator noise, see e.g. DE 33 05 770 A1, page 8 line 11 and on, but the unique aspect of the invention is that the motors are caused to run in parallel by the pseudomotors, while the commutator frequency is used for fine adjustment of the control. Since, beforehand, the commutator frequencies from the individual motors are the same or quite close to each other, the compensation circuit can respond quickly. A control exclusively based on commutator frequency will basically respond too slowly and will also be too complicated and expensive. It should be noted that a linear actuator has a speed, which is typically of the order of 50 mm/sec, i.e. the control must respond relatively quickly to avoid travelling non-uniformly.

In the prior art solutions, the speed depends on the construction of the actuating device, while the invention adjusts speed through determination of a reference value, as the reference applies the voltage at which the motor should desirably run. Thus, a high reference value gives a high speed, and vice versa.

The present control may be implemented at low cost and without computer control. It will be appreciated that this does not rule out the possibility that the invention may be used in general for the control of two or more DC motors.

BRIEF DESCRIPTION OF THE DRAWINGS

The invention will be explained more fully below with reference to the accompanying drawings. In the drawings.

DESCRIPTION OF THE INVENTION

Figure 1:
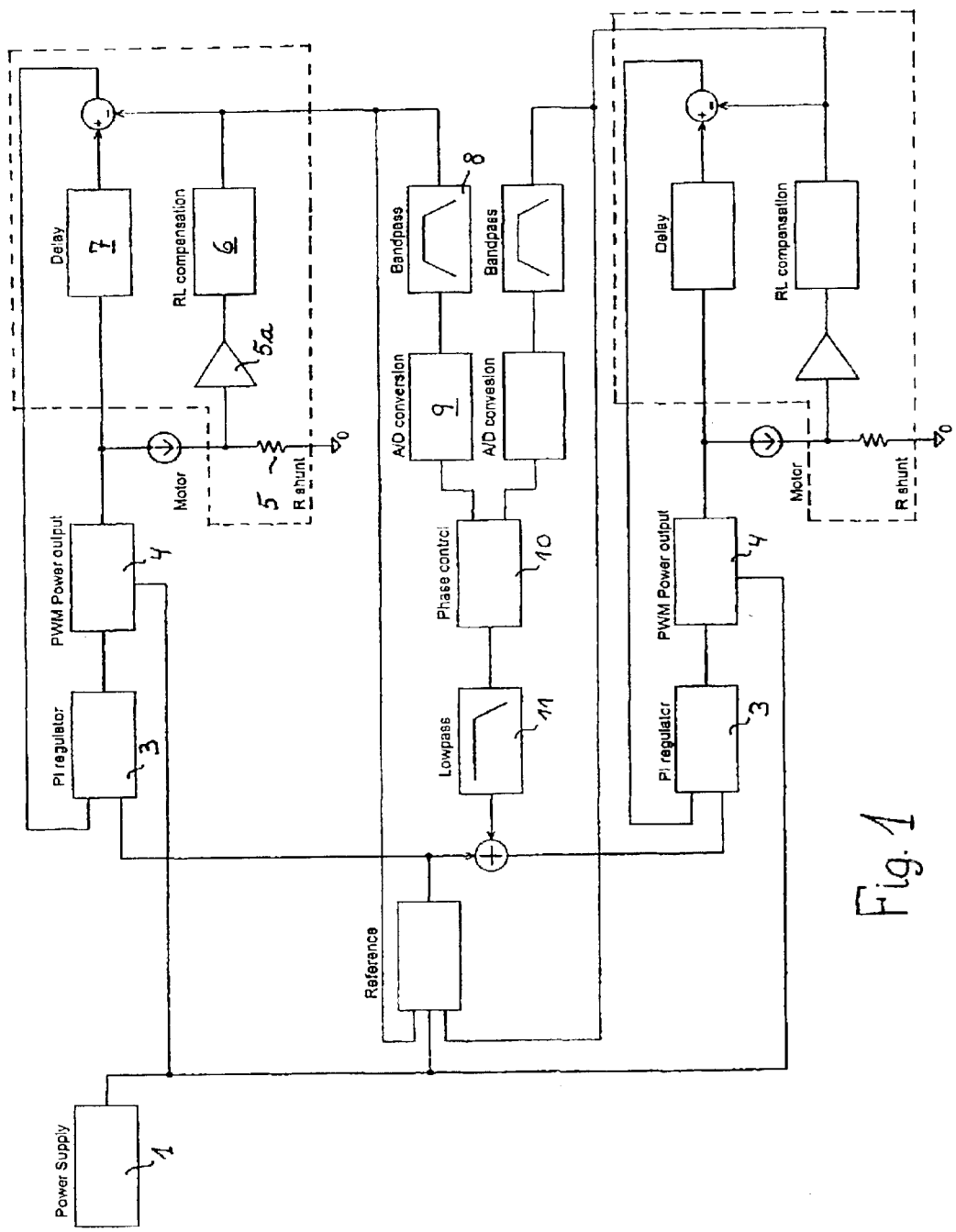
FIG. 1 shows a block diagram of an embodiment of the control according to the invention.

Referring now to the block diagram in FIG. 1 the present control comprises:

1: A power supply
 2: A reference
 3: A PI regulator
 4: A PWM power output
 5: A R shunt with amplifier
 6: A RL compensation
 7: A delay
 8: A band-pass filter
 9: A A/D conversion
10: A phase control
11: A low-pass filter

1: Power Supply

The power supply comprises a transformer, a bridge coupling and a rectifier capacitor. It supplies the necessary energy to the system and is therefore the "block" that limits the performance of the system with respect to load and speed of the actuators. The voltage is unregulated, therefore is superposed by some ripple when loaded.

2: Reference

The reference "block" controls the system, and determines how fast the actuators must/may run. The reference circuit receives information from the two actuators and the power supply, and supplies a reference voltage based on the information that enables the other circuits to stay within their regulation ranges.

3: PI Regulator

The PI regulator regulates the speed of the individual actuator as close as possible to the voltage (speed) determined by the reference. The regulator contains a proportional part P, to keep the difference small at rapid changes in load, and an integration part I, to make the difference go toward zero over an extended period of time.

4: PWM Power Output

The PWM power output regulates the energy to the actuator. This is done by quickly connecting the power supply to and disconnecting it from the actuator. The proportion of the connection time and the disconnection time thus determines the supply of energy.

5: R Shunt with Amplifier

The resistor R converts the current running through the actuator into a voltage. This voltage is amplified in the subsequent amplifier so that the output voltage corresponds to the voltage lying across the internal resistance in the motor plus the one lying across the shunt resistance.

6: RL Compensation

The RL compensation compensates for current delays caused by the motor which contains a coil. This coil contributes to delaying the current relative to the voltage across the motor, which means that there will always be a time delay between voltage and speed of the motor.

7: Delay

To find the "internal voltage" of the motor, it is necessary to subtract the potential cross the internal resistance and the coil in the motor. This is done in a subtraction circuit, but for the result to be correct it is necessary that the signals to be subtracted from each other arrive at the same time. Therefore, a delay is introduced in the direct path to the subtraction point, which corresponds to the delay existing in the path through the motor.

8: Band-Pass

The band-pass filter extracts the commutator noise from the motor and removes all other noise. The bandwidth of the filter is adapted to the range of speed in which the motor will normally operate (1800–4000 r.p.m.).

9: A/D Conversion

For these two signals to be compared, they may advantageously be converted into digital values. The values may now be processed according to various logical rules, as needed.

10: Phase Control

Here, the two signals are compared for match/uniformity, and as a result an instantaneous evaluation of the relation of the two signals to each other is emitted. When the motors are running at the same speed the two signals are totally identical, phase displaced 90°, and an average value of zero is given and no adjustment is made.

11: Low-Pass

Since the signal from the phase control provides instantaneous values and the double frequency is generated when comparing the two signals, averaging of this signal is needed. This is done by means of the low-pass filter.

Figure 2:
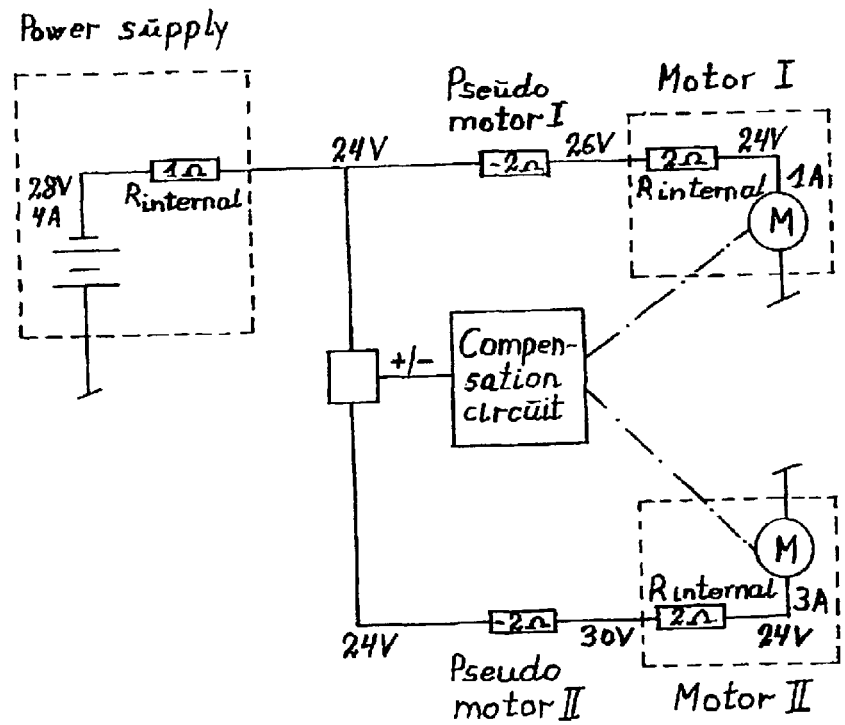
FIG. 2 shows an explanatory block diagram of the control for further understanding of the invention.
Figure 3:
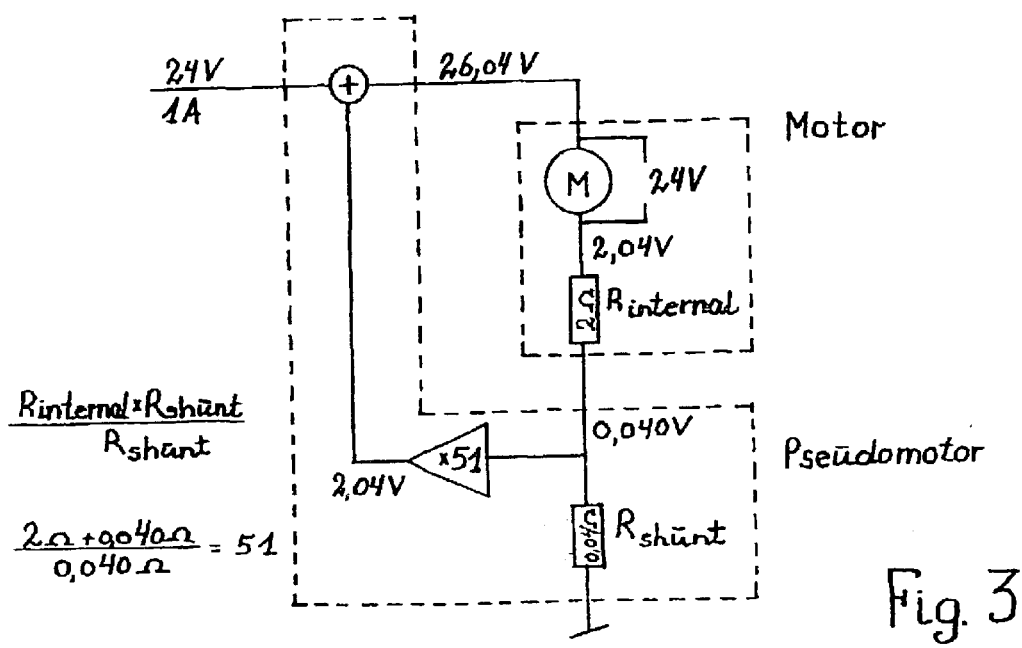
FIG. 3 shows a block diagram illustrating the individual motor.

With reference to the explanatory block diagrams in FIGS. 2 and 3 the invention is explained in further detail. The diagrams and the values indicated in the diagrams exclusively serve to explain, but not limit the invention. To simplify the description, this takes its point of departure in the ohmic resistances, but the explanation is basically the same for the other electrical phenomena, such as the inductance.

The explanation is based on a height-adjustable desk having a height-adjustable leg at each side, where the height adjustment is performed with a linear actuator driven by a DC motor.

As shown in FIG. 2, the DC motors I, II of the actuators are connected in parallel to an adjustable DC power supply. A pseudomotor I, II is provided in the inlet to the two motors I, II. Also present is a compensation circuit having a signal input from each of the two motors I, II for commutator noise.

For example, if the end of the table is suddenly loaded by an additional apparatus when the tabletop is raised, the actuator concerned, i.e. motor II, will decelerate, and there will be a correspondingly greater current draw, e.g. 3 A, which is recognized in the pseudomotor II, so that the voltage from the power supply to the motor will be stepped up correspondingly to 30V.

FIG. 3 of the drawing exemplifies an embodiment of the pseudomotor and its mode of operation. The pseudomotor is based on a shunt resistor and an amplifier whose gain is determined on the basis of the formula:

$$\frac{R_{internal} + R_{shunt}}{R_{shunt}}$$

The voltage from the amplifier is added to the voltage from the power supply. When the current draw from the motor is increased e.g. from 1 A to 3 A., the voltage to the motor will be increased correspondingly from 26.04V to 30.12V.

If, because of manufacturing tolerances, the motors do not run at exactly the same speed, the motor speeds are adjusted with the compensation circuit until a dominating commutator frequency from the two motors is within a predetermined value. In this respect one motor is picked as a master and the other as a slave to follow this.

In hospital beds with Trendelenburg adjustments, Trendelenburg adjustments can readily be performed e.g. by activation of one actuator or both of them, but then is in their separate directions. If the bed is to be raised or lowered while it is in a Trendelenburg position, the actuators are activated in parallel, i.e. in the same direction and the mattress frame is thereby displaced in parallel. The mattress frame is brought from a Trendelenburg position or an unintentional oblique position to a horizontal position by running it to an extreme position or by control of the actuators. Trendelenburg adjustment, tilting the mattress frame about an axis perpendicular to the mattress frame, is well known and e.g. described in U.S. Pat. No. 4,425,673, see FIG. 7 to 10 and the relating text.

The invention is based on model motors and no direct feedback for the evaluation of the current position of the actuators.

As understood from the above, the invention provides a new way of controlling and regulating two or more actuators so that these run in parallel, irrespective of differences in load, without using microprocessors and feedback other that of the motor in the actuator, in other words no reed switches, hall elements or potentiometers.

Thus, the invention provides a simple and low cost parallel control of two or more DC motors which will meet most requirements to parallel running of actuators within the furniture industry, including nursing and hospital equipment.

What is claimed is:

1. A control for two or more DC motors adapted to adjust the power supply to the individual motors such that the motors mutually keep the same or essentially the same speed independent of different loads on them, comprising a device for adjusting the power supply for each individual motor, a pseudomotor connected to each individual motor, said pseudomotor being constructed to supply a voltage which corresponds to a speed of the motor on the basis of the current and voltage supplied to the motor, wherein the voltages of the pseudomotor supplied to the power supply adjusting device are compared with a common reference voltage, and, when one motor experiences a greater load than the load of the other motors, the reference voltage is reduced such that the power supply to the other motors is reduced reducing the speed of the other motors corresponding to the reduction in speed of the one motor with the greater load.

2. A control according to claim 1, wherein the control additionally comprises a compensation circuit constructed according to a frequency of commutator noise of the motors, wherein a comparison is made in the compensation circuit of the frequencies of the commutator noise of each the motors, and, in case of a deviation of the frequency of one motor relative to the frequencies of the other motors, the power supply to said one motor or to the other motors is adjusted so that the frequencies of the commutator noise of all the motors are within a predetermined value.

3. A control according to claim 2, wherein the frequency of the commutator noise is a dominating frequency.

4. A control for two or more furniture actuator motors comprising a device for adjusting the power supply for each individual motor, a pseudomotor connected to each individual motor, said pseudomotor being constructed to supply a voltage which corresponds to a speed of the motor on the basis of the current and voltage supplied to the motor, wherein the voltages of the pseudomotor supplied to the power supply adjusting device are compared with a common reference voltage, and, when one motor experiences a greater load than the load of the other motors, the reference voltage is reduced such that the power supply to the other motors is reduced reducing the speed of the other motors corresponding to the reduction in speed of the one motor with the greater load.

* * * * *